Sept. 8, 1964 B. B. BAUER ETAL 3,148,287

SIGNAL PHASE SENSING AND MAINTAINING SYSTEM

Filed March 9, 1961 2 Sheets-Sheet 1

INVENTORS:
BENJAMIN B. BAUER
ABRAHAM A. GOLDBERG
GEORGE D. POLLACK
BY
Brumbaugh, Free, Graves & Donohue
THEIR ATTORNEYS INVENTORS:
BENJAMIN B. BAUER
ABRAHAM A. GOLDBERG
GEORGE D. POLLACK
BY
Brumbaugh, Free, Graves & Donohue
THEIR ATTORNEYS

United States Patent Office 3,148,287

Patented Sept. 8, 1964

3,148,287

SIGNAL PHASE SENSING AND MAINTAINING SYSTEM

Benjamin B. Bauer and Abraham A. Goldberg, Stamford, Conn., and George D. Pollack, Mount Vernon, N.Y., assignors to Columbia Broadcasting System, Inc., New York, N.Y., a corporation of New York Filed Mar. 9, 1961, Ser. No. 94,539
3 Claims. (Cl. 307—127)

Figure 1:
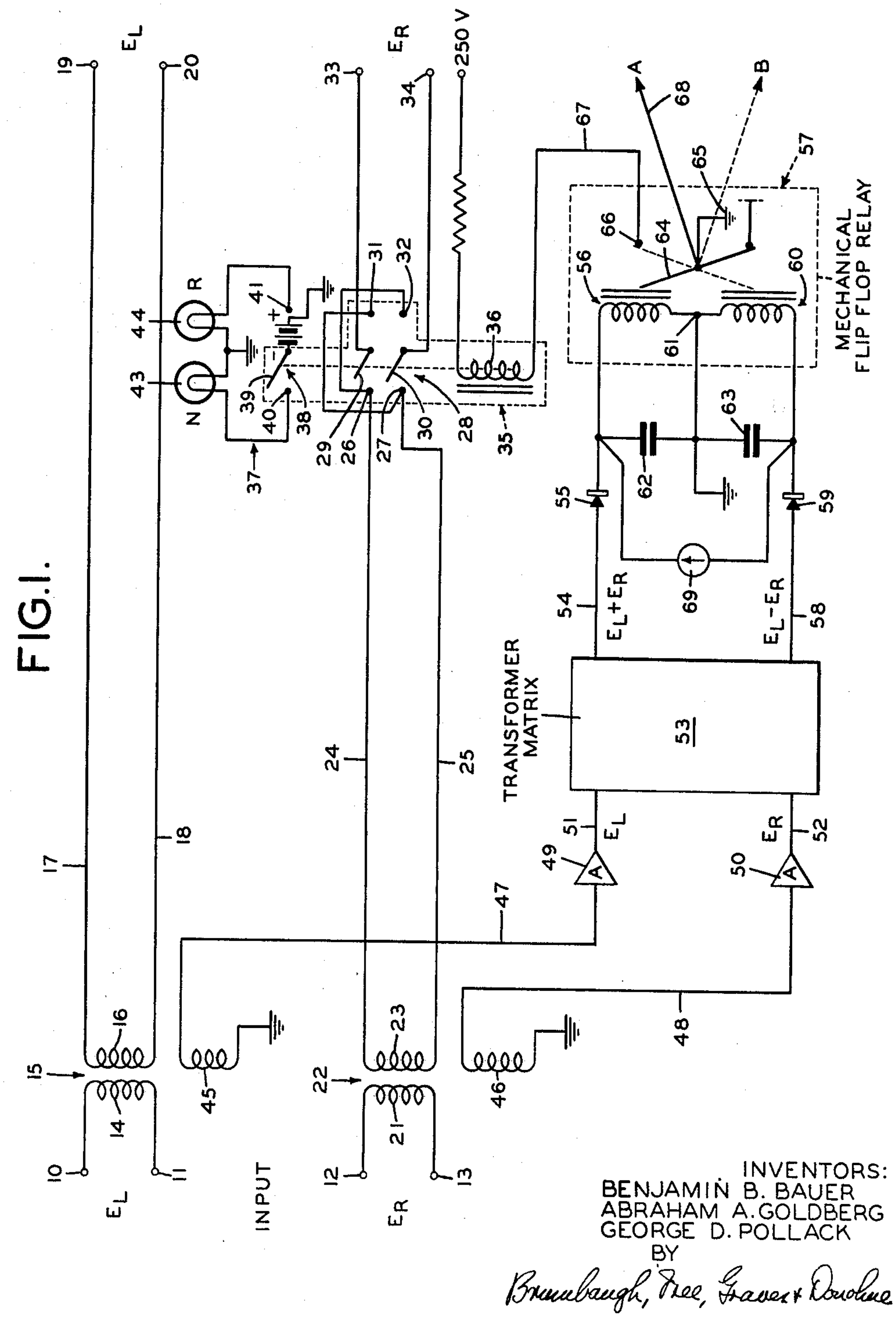

This invention relates to a signal phase sensing system and, more particularly to a system for maintaining a predetermined phase relationship between stereophonically related signals, although it is not limited to such use.

It is well known that stereophonically related signals must be maintained in proper phase relation if the benefits of stereophonic reproduction are to be realized. Thus, if stereophonically related signals of incorrect phase are added together for transmission by a monophonic broadcasting station, or a compatible stereophonic station, the center sounds reproduced at a receiver will be attenuated and distorted. Similary, in stereophonic recording, such errors in phasing cause incorrect stereophonic reproduction, because the "center image" (e.g., the soloist) cannot be localized, and low frequencies are attenuated.

In both fields, the possibility of accidental phase reversal is always present because of the relative system complexity between the source material and the broadcast transmitter or recording lathe as the case may be. It has been proposed to determine the phase of the stereophonic signals intermittently by employing an audio oscillator in the regular program channel and comparing the phase relationship on an oscilloscope. This method is not entirely satisfactory because it is inconvenient and affords no assurance that an accidental phase reversal will not occur unnoticed during a program.

An object of the present invention, accordingly, is to provide a method and apparatus for continuously maintaining a predetermined phase between related signals such as stereophonic sound signals, for example.

A further object is to provide a method and means for monitoring the phase of related signals of the above character and for effecting appropriate corrections in the phase of the signals when an undesired phase relation exists.

In accordance with the invention, left and right signals $E_L$ and $E_R$, respectively, from corresponding left and right transmission channels are combined both additively and subtractively to produce a monophonic or centered component $E_L+E_R$ and a stereophonic component $E_L-E_R$. Normally, when the phase relation between the signals $E_L$ and $E_R$ is correct, the average monophonic component $E_L+E_R$ is greater in magnitude than the average stereophonic component $E_L-E_R$. However, if the signal in one of the channels accidentally becomes reversed, the opposite is true. The two components are continuously compared in magnitude and whenever the magnitude of the difference component $E_L-E_R$ is found to be greater than the sum component $E_L+E_R$, the signal in one of the channels is immediately reversed to restore the proper phase relation. In this fashion, the proper phase relation between the two stereophonic signals is always maintained, regardless of erroneous system connections.

Figure 2:
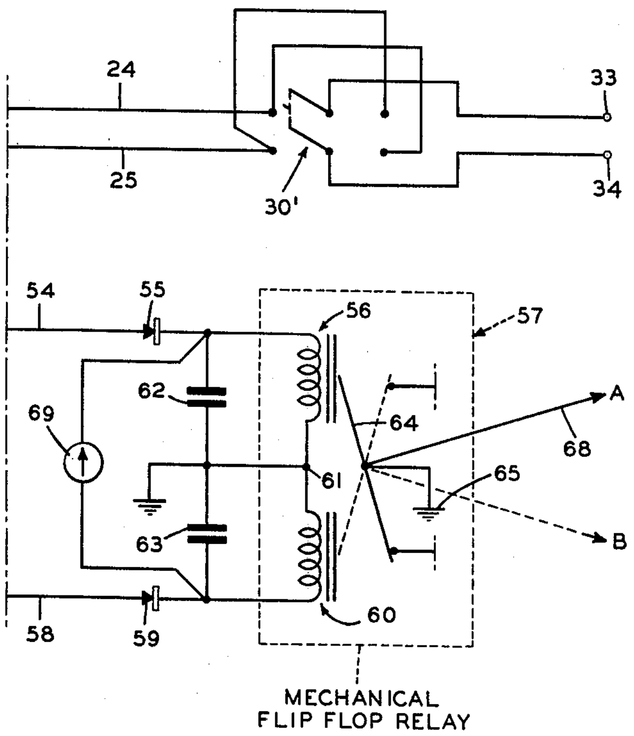

Various other objects and advantages will appear from the following detailed description of several representative embodiments of the invention, taken in conjunction with the accompanying drawings, in which:

FIG. 1 is a simplified block diagram of a phase sensing and maintaining system constructed according to the invention; and FIG. 2 is a schematic diagram of a modification of part of the system shown in FIG. 1.

In the typical phase sensing and maintaining system shown in FIG. 1, left and right stereophonic signals $E_L$ and $E_R$, respectively, from record media or microphones, for example, are fed to input terminals 10, 11 and 12, 13, respectively. The left signal $E_L$ at the terminals 10 and 11 passes to the primary winding 14 of a transformer 15 having a secondary winding 16. The secondary winding 16 is connected to the conductors 17 and 18 which terminate in output terminals 19 and 20.

The right stereophonic signal $E_R$ at the input terminals 12 and 13 is supplied to the primary winding 21 of a transformer 22 having a secondary winding 23. The secondary winding 23 is connected through the conductors 24 and 25 to the fixed contacts 26 and 27 of a double pole double throw switch 28. The switch 28 has a pair of ganged movable contacts 29 and 30 which are adapted to engage selectively either the contacts 26 and 27 or another pair of contacts 31 and 32 electrically connected to the contacts 27 and 26, respectively. The contacts 29 and 30 are connected directly to the output terminals 33 and 34.

It will be understood that when the movable contacts 29 and 30 are in engagement with the switch contacts 26 and 27, respectively, the conductors 24 and 25 are connected directly to the output terminals 33 and 34. Conversely, when the movable contacts 29 and 30 are in engagement with the contacts 31 and 32, respectively, the connections between the conductors 24 and 25 and the terminals 33 and 34 are reversed.

While the reversing switch 28 may be manually operated, as will later be described herein in connection with FIG. 2, preferably the movable contacts 29 and 30 are normally maintained engaged with the contacts 26 and 27 by suitable means such as a spring (not shown), and are adapted to be switched into engagement with the contacts 31 and 32 by means such as a relay 35 when its winding 36 is energized in the manner described below.

Preferably, indicator means 37 is provided to indicate the condition of the switch 28 and thus signal to an observer whether the stereophonic signals are in the correct phase relation or not. It comprises a single pole double throw switch 38 having a movable contact arm 39 ganged to the movable contacts 29 and 30 of the reversing switch 28. A suitable source of current such as a battery is connected between the movable contact arm 39 and ground. The fixed contacts 40 and 41 are connected in series with signalling devices such as the lamps 43 and 44, respectively, the lamp circuits being returned to ground as shown in the figure. Therefore, one or the other of the lights 43 and 44 will be lighted indicating visually the position of the reversing switch 28.

In accordance with the invention, the movable switch contacts 29 and 30 normally are maintained in engagement with the fixed contacts 26 and 27 so long as the sum of the signals $E_L$ and $E_R$ in the two channels is greater in magnitude than the difference. However, if the sum becomes less than the difference as a result of an inadvertent reversal in phase of one of the two signals, the switch 28 is operated, reversing the signal in its channel so that the proper phase relation between the two signals is maintained.

This is accomplished by means including tertiary windings 45 and 46 on the transformers 15 and 22, respectively, which supply the signals $E_L$ and $E_R$ through the conductors 47 and 48, respectively, the amplifiers 49 and 50, respectively, and the conductors 51 and 52, respectively, to a matrixing device 53.

The amplifiers 49 and 50 are of conventional design and are, therefore, illustrated only diagrammatically. The frequency bandwidth transmitted by these amplifiers need be no greater than about 150 to 1200 cycles per second, since it has been found that the higher frequencies contribute very little to the phase analysis and are, in fact, detrimental. Also, these amplifiers should preferably incorporate automatic gain control so as to be capable of effective operation over a reasonably wide range of input signal level.

The matrixing device 53 may be any device capable of adding the amplifier signals to produce a sum signal $E_L+E_R$ and of separately subtracting the amplified signals to produce a difference signal $E_L-E_R$. The sum signal $E_L+E_R$ is conveyed by a conductor 54 through a rectifier 55 to one winding 56 of a flip-flop relay 57. The difference signal $E_L+E_R$ is fed by a conductor 58 through a rectifier 59 to a second winding 60 on the flip-flop relay 57. The windings 56 and 60 are connected in series and the junction 61 between them is grounded as shown. Filter capacitors 62 and 63 are connected in shunt across the windings 56 and 60, respectively. Desirably, the rectifier circuits should have time constants of the order of 5 seconds, although this is not critical.

The flip-flop relay 57 has an armature 64 which is grounded at 65 and which is movable into and out of engagement with a fixed contact 66 depending upon whether the sum signal $E_L+E_R$ is smaller or larger in magnitude, respectively, than the difference signal $E_L+E_R$. The fixed contact is connected through a conductor 67 and the winding 36 of the relay 35 to a source of electrical energy (not shown) for energizing the relay.

In operation, so long as the phase of the signals $E_L$ and $E_R$ in the two channels is correct, the sum signal $E_L+E_R$ energizing the winding 56 of the flip-flop relay 57 will be greater in magnitude than the difference signal $E_L-E_R$. Hence, the relay armature 64 will be maintained out of engagement with the contact 66 so that the relay 35 will not be energized. The switch 28, therefore, will be in its normal position and will connect the conductors 24 and 25 directly to the terminals 33 and 34, respectively. Likewise, the switch 38 will be in its normal position so that the lamp 43 will be lighted, providing a visual indication that the phase relation is correct.

If, however, the phase of one of the signals $E_L$ or $E_R$ should inadvertently become reversed as a result of an incorrect system connection, for example, the difference signal $E_L-E_R$ will now appear on the line 54 instead of the line 58 and the sum signal $E_L+E_R$ will appear on the line 58 instead of the line 54. As a result, the armature 64 of the flip-flop relay 57 will be moved into engagement with the fixed contact 66 and will energize the relay 35. This will operate the reversing switch 28 causing it to reverse the connections between the conductors 24 and 25 and the terminals 33 and 34 so that the correct phase is restored.

At the same same, the movable contact 39 of the switch 38 is disengaged from the fixed contact 40 and engages the fixed contact 41. As a result, the lamp 43 is extinguished and the lamp 44 is lighted, indicating both reversal of the phase of one of the signals and also the simultaneous restoration of the correct phase relation.

If desired, a center zero voltmeter 69 or other suitable indicating instrument may be connected across the windings 56 and 60 of the flip-flop relay 57 to indicate visually the phase relation between the stereophonic signals $E_L$ and $E_R$. When the correct phase relation obtains and the sum is greater than the difference, the pointer of the meter 69 will be deflected to one side of the center zero. For the incorrect phase, the pointer will be deflected to the opposite side of the center zero.

In the embodiment illustrated in FIG. 2, the construction and operation of the system is as illustrated and described in connection with FIG. 1, except that the double pole, double throw switch 30' is operated manually instead of by the relay 35. A visual indication of incorrect phase relation may be provided by the voltmeter 69 or by attaching a pointer 68 to the armature 64 of the flip-flop relay 57. In position A of the pointer 68, the sum signal $E_L+E_R$ is greater in magnitude than the difference signal $E_L-E_R$ and the correct phase relation obtains. When the phase relation is incorrect, the larger sum signal appears on the line 58 and the pointer 68 assumes the position B. This will inform an operator that the phase relation is incorrect, whereupon he can manually operate the double throw, double pole, reversing switch 38' to restore the correct phase relationship.

The invention thus provides novel and effective means for sensing incorrect phasing in stereophonic signals and the like, and for automatically restoring the correct phase. By sensing the sum and difference of the signals and comparing them to determine which is greater in magnitude, errors in phase can be observed as soon as they occur and action can be taken either manually or automatically in response to the sum and difference magnitudes to effect restoration of the correct phase relation.

It will be understood that the invention is not limited to stereophonic signals but has application also to other periodically varying signals. All that is necessary is that the average magnitudes of the sum and the difference of the signals be significantly different. Also, specific components such as switches, signal lamps and relays, for example, in the forms of the invention described above are merely exemplary, and other equivalent devices can be used within the skill of the art.

While the invention has been illustrated above in connection with specific apparatus, it is to be clearly understood that the specific embodiments described herein are intended only as examples and not as limitations upon the scope of the invention as set forth in the accompanying claims.

We claim:

1. In signal transmission apparatus, the combination of first signal transmission channel means for a first signal, second signal transmission channel means for a second signal, signal phase changing means in one of said transmission channel means, means coupled to said first and second transmission channel means for producing a first monitoring signal representing the sum of said first and second signals, means coupled to said first and second transmission means for producing a second monitoring signal representing the difference between said first and second signals, and means responsive to said first and second monitoring signals and rendered operative for a given magnitude relationship between said monitoring signals for actuating said phase changing means.

2. In signal transmission apparatus, the combination of first signal transmission channel means for a first signal, second signal transmission channel means for a second signal, signal phase changing means in one of said transmission channel means, means coupled to said first and second transmission channel means for producing a first monitoring signal representing the sum of said first and second signals, means coupled to said first and second transmission means for producing a second monitoring signal representing the difference between said first and second signals, and means responsive to the average values of said first and second monitoring signals and rendered operative when the average value of said difference signal is greater than the average value of said sum signal for actuating said phase changing means.

3. Signal transmission apparatus as defined in claim 2 together with first and second signalling means, and switching means coupled to said phase changing means for actuation therewith to control the operation of said first and second signalling means.

References Cited in the file of this patent

UNITED STATES PATENTS

| | | |
|---|---|---|
| 2,454,807 | Kennedy | Nov. 30, 1948 |
| 2,541,313 | Vossberg et al. | Feb. 13, 1951 |
| 2,733,004 | Richardson | Jan. 31, 1956 |
| 2,796,556 | Larew | June 18, 1957 |
| 2,906,956 | Masonson | Sept. 29, 1959 |
| 2,923,884 | Moss | Feb. 2, 1960 |
| 2,964,682 | Jansen | Dec. 13, 1960 |
| 3,083,264 | Wintringham | Mar. 26, 1963 |

OTHER REFERENCES

Bauer et al.: 2-Way Stereo Amplifier; Radio Electronics; December 1958; pp. 41, 42.

Burstein: Stereo Amplifier Controls—and what they do; Electronics World; August 1959; pp. 55–57, 122.

UNITED STATES PATENT OFFICE
CERTIFICATE OF CORRECTION

Patent No. 3,148,287 September 8, 1964

Benjamin B. Bauer et al.

It is hereby certified that error appears in the above numbered patent requiring correction and that the said Letters Patent should read as corrected below.

Column 3, lines 21 and 34, for $E_L+E_R$", each occurrence, read -- $E_L-E_R$ --.

Signed and sealed this 19th day of January 1965.

(SEAL)
Attest:

ERNEST W. SWIDER
Attesting Officer

EDWARD J. BRENNER
Commissioner of Patents